United States Patent [19]
DeSourdis

[11] 3,889,907
[45] June 17, 1975

[54] MACHINERY MOUNT
[75] Inventor: Paul L. DeSourdis, Millbury, Mass.
[73] Assignee: The Felters Company, Millbury, Mass.
[22] Filed: Mar. 30, 1973
[21] Appl. No.: 346,417

[52] U.S. Cl............... 248/24; 248/358 R; 267/153
[51] Int. Cl............................................. F16f 15/00
[58] Field of Search ............ 248/24, 21, 22, 15, 9, 248/358 R; 267/153

[56] References Cited
UNITED STATES PATENTS

| 1,579,185 | 3/1926 | Weiland | 248/358 R X |
| 2,118,085 | 5/1938 | Helmond | 248/24 |
| 2,739,774 | 3/1956 | Crede | 248/24 |
| 2,908,456 | 10/1959 | Gertel | 248/24 |
| 3,351,308 | 11/1967 | Hirst | 248/22 |
| 3,351,309 | 11/1967 | Harrison | 248/22 |
| 3,717,318 | 2/1973 | Yamasita | 248/358 R X |
| 3,815,852 | 6/1974 | May | 248/24 |

Primary Examiner—J. Franklin Foss
Attorney, Agent, or Firm—Norman S. Blodgett; Gerry A. Blodgett

[57] ABSTRACT

A machinery mount possessing multi-dimensional damping properties, including a bottom pad, a base on the pad having upwardly-directed flanges, a pocket member on the base having an upwardly directed recess, and resiliently mounted in the flanges by the use of side pads, and a jack-and-nut arrangement in the recess.

6 Claims, 3 Drawing Figures

PATENTED JUN 17 1975   3,889,907

SHEET 1

MACHINERY MOUNT

BACKGROUND OF THE INVENTION

For many reasons the damped mounting of machinery is an important consideration in design. Vibrational isolation, as the subject is generally called, includes the reduction of vibrational interference both from the machine to its surroundings and visa versa. Uncontrolled vibrational transfer can result not only in noise and structural damage, but also can effect accuracy in the machine operation. Early attempts at solving the isolation problem involved simply placing resilient pads of rubber or felt under a rigid machine mount. This system was well received in its time, even in view of obvious shortcomings. As tolerances in machine operation became tighter, the deleterious effects of uncontrolled vibration became the subject of considerable interest. The effect of vibration on machining operations was seen as a multi-dimensional phenomena, while the above-mentioned pad construction was primarily of value for vertical vibrations normal to the pad. Horizontal vibrations were transferred to the pad as shear. Although felt absorbed shear-type vibrations better than rubber (due to its plastic rather than elastic properties) it was more prone to creep. In rubber pads, creeping was not as much of a problem, but the low spring-constant shear characteristics of rubber tend to increase rather than damp horizontal and rotational vibrations. Additionally, for both materials, the characteristics of the pad (and thus the degree of shear damping) were dictated by the vertical load the pad had to carry. The attempted solutions to this problem have included extending the bottom upwardly beside the support, so that horizontal vibration caused compression stress on the pad. Although this type of design has many advantages over the old construction, it still had drawbacks. The various designs were either too complex to be produced at competitive prices or so simple that precise tailoring and flexibility were not possible. Furthermore, they were generally adapted for the use of rubber or other elastomer as the pad. The pad configurations were not conducive to the use of felt, which has different and often superior damping qualities, but is harder to form into complex shapes. These and other difficulties experienced with the prior art devices have been obviated in a novel manner by the present invention.

It is, therefore, an outstanding object of the invention to provide a machinery mount which damps vibration in all modes of motion.

Another object of this invention is the provision of a machinery mount which allows tailoring of damping requirements in various modes of motion.

A further object of the present invention is the provision of a machinery mount which is particularly suited for absorbing horizontal vibrations while maintaining even vertical support over the length of the vibration.

It is another object of the instant invention to provide a machinery mount which allows the use of felt as a damping substance.

A still further object of the invention is the provision of a machinery mount which is simple and inexpensive to manufacture and capable of a long and useful life.

It is a further object of the invention to provide a machinery mount in which the damping elements for various modes of vibration are separate and thus can be tailored to specific application.

It is a still further object of the present invention to provide a machinery mount in which creep is not significant.

With these and other objects in view, as will be apparent to those skilled in the art, the invention resides in the combination of parts set forth in the specification and covered by the claims appended hereto.

SUMMARY OF THE INVENTION

This invention involves a machinery mount for isolating machinery and damping vibration. More particularly it provides separate damping in horizontal and in vertical directions and is particularly adapted for the use of felt as the damping material. The invention consists of a jack and leveling assembly, a base on which the assembly is slidably mounted, flanges directed upwardly from the base, thus limiting the sliding movement of the assembly by means of resilient side pads. A bottom pad is provided beneath the base.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
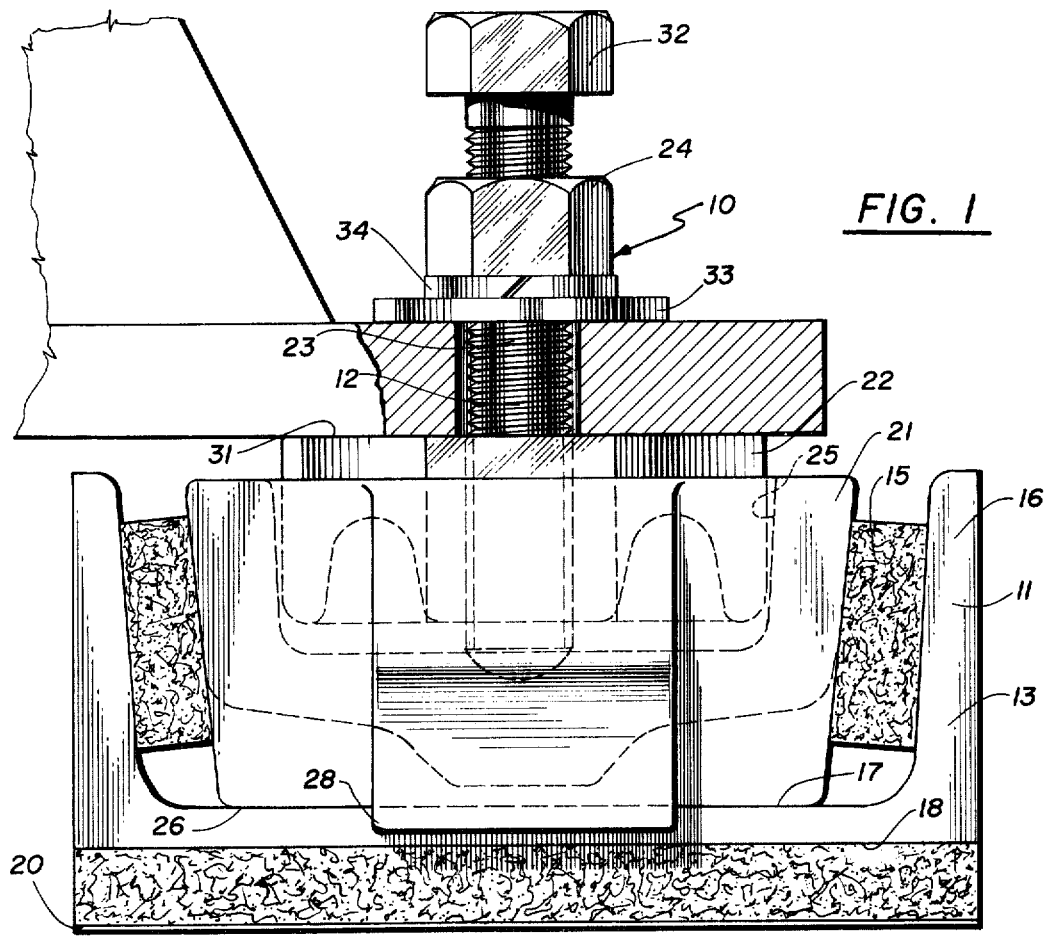
FIG. 1 is a front elevation view of a machinery mount embodying the principles of the present invention.
Figure 3:
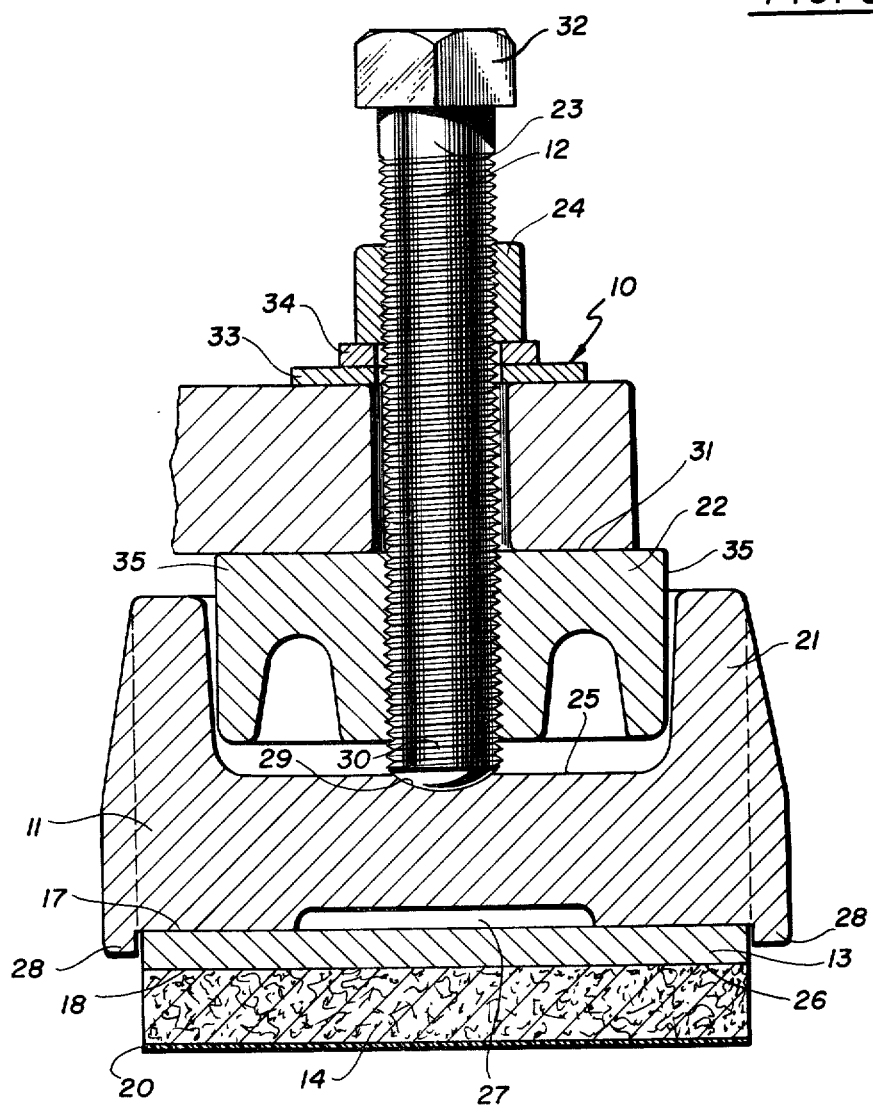
FIG. 3 is a vertical sectional view of the invention taken along line III—III of FIG. 2.

Referring first to FIG. 1, wherein are best shown the general features of the present invention, the machinery mount, indicated generally by the numeral 10, is shown as including a base assembly 11 and a jack assembly 12.

The base assembly 11 consists of the base 13 itself, a bottom pad 14 and two side pads 15. The base 13 is formed from a short length of channel iron. It has a flange 16 upwardly directed at each end, an upper flat surface 17 and a bottom flat surface 18.

It should be noted that in this specification, the relative direction of elements will be discussed as if the embodiment were used as a floor mounted support for a machine with the jack pointing upward from the floor. If the invention is used in another orientation with respect to the machine, one skilled in the art would be easily able to transpose the relative directions.

Adhesively bonded to the bottom surface 18 is a bottom pad 14 of uniform thickness over the bottom surface 18.

The bottom pad in the preferred embodiment is formed of felt although other materials can be used. The factor that makes felt a particularly useful isolating material in certain applications is that it is non-homogeneous and is directional in both structure and physical characteristics. More particularly, felt is formed of only slightly intermeshed layers and the spring and damping characteristics differ greatly between motion in the plane of the layers and motion perpendicular to the plane. Additionally, there is considerable difference in spring and damping depending on whether force is applied as shear or compression. As a result, many isolating and damping situations are better handled by felt-type materials than non-directional materiels.

Adhesively bonded to the bottom surface of the bottom pad 18 is a thin layer 20 of vinyl or other material of high coefficient of friction. This layer reduces creeping by the machinery mount and allows the mount to be used without other anchoring. The bottom surface of the vinyl layer may be improved by providing depressions which act as suction cups.

Inwardly directed on and bonded to the flanges 16 are side pads 15 which, like the bottom pad 14, are of material having different directional spring and damping characteristics. The materials of the side and bottom pad may be the same or different and directional materials may or may not be oriented differently to the active motions.

The jack assembly 12 consists of a pocket member 21, a nut member 22, a jack 23, and jack nut 24. The pocket member 21 is formed of cast iron with an upwardly-directed recess 25, a flat bottom surface 26 with a depression 27, and lips 28 extending downward from two opposed edges. The bottom surface 26 of the pocket member 21 is slidably mounted on the upper surface 17 of the base 13 but the pocket member 21 is limited to linear motion by the contact of the lips 28 with the edges of the base 13.

The central portion of the recess 25 has a depression 29 which engages the rounded lower end 30 of the jack 23 and it is this contact which bears the weight of the machinery. The contacting surfaces are correspondingly spherical which allows slight angular movement without reduction in contact area. The angular movement allows compensation for non-level floors.

Figure 2:
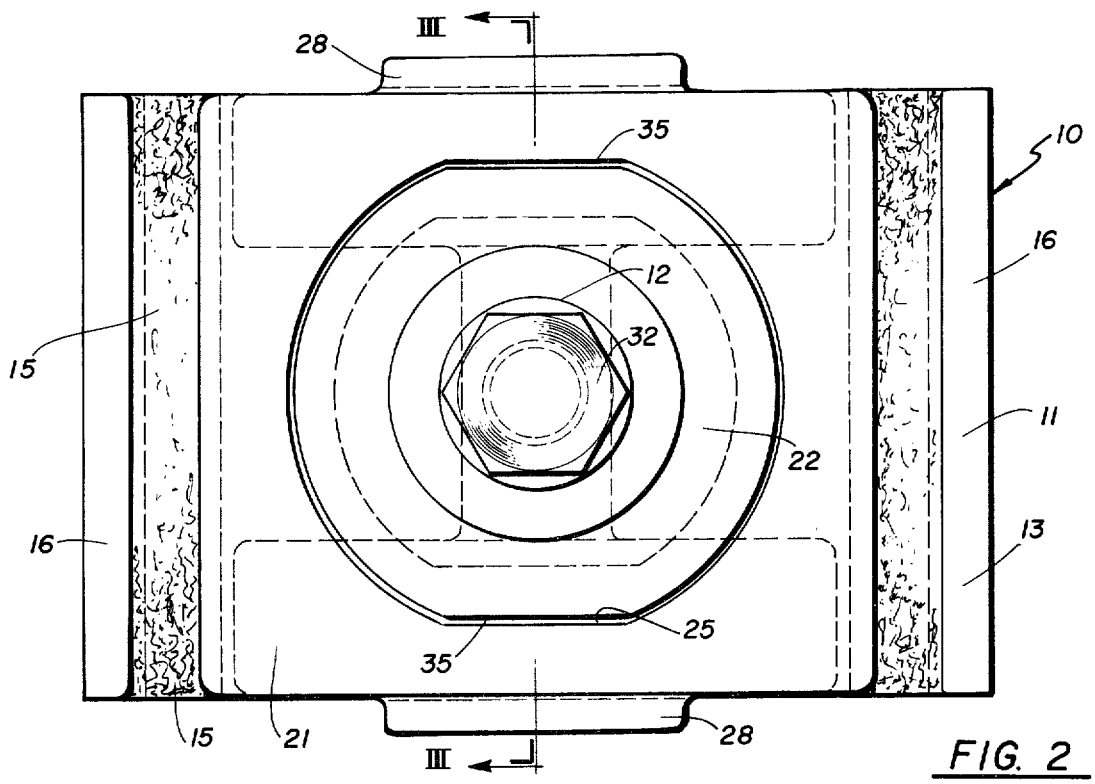
FIG. 2 is a plan view of the machinery mount.

The jack 23 is an elongated threaded shaft with a flated upper end 32. Threaded onto the jack 23 by a threaded bore 36 and residing in the recess 25 is nut member 22. Clearance between the nut member 22 and the walk of the recess allow movement of the nut member along with the jack. This movement allows the leveling effect of the mount, since the machine actually rests on the upper surface 31 of the nut member 22. As can be seen in FIG. 2, both the recess and the nut member 22 are provided with flats 35, which disallow rotation of the nut member in the recess. As a result, rotation of the upper end 32 of the jack causes axial movement of the nut member on the jack.

The jack nut 24 is threaded on the jack along with a washer 33 and lock washer 34 so that the leg of the machine is clamped between the washer 34 and the upper surface of the member 21.

The operation of the present invention will now be readily understood in view of the above description. The mounts are placed in predetermined locations on the floor with the shaft removed from the nut member. The machine is lowered onto the mount so that the bore in the nut member and the machine leg bore align. Then the jack is placed through the machine leg bore and threaded into the bore of the nut member 22. As the rounded lower end 30 of the jack 23 extends from the nut member and contacts the depression 29, it lifts the nut member 22 from contact with the pocket member 21 and allows a pivoting action which compensates for differences in floor and machine planes. As jack 23 is turned further through the nut member 22, the nut member moves up the shaft. This allows the machine to be leveled when at least three such mounting units are used. When the system is completely adjusted, the jack nut 24 is tightened down on the machine leg to lock the elements in place.

The particular embodiment described above, was designed for a large injection moulding machine. The particular problem for which the present invention is particularly suited, concerns the extraordinary linear and horizontal shock generated by the opening and closing of the dies. This application requires a high load capacity in the vertical direction and large displacement and very high damping in one horizontal direction. The low shear displacement of the bottom pad 14 causes horizontal vibration to be handled by the low spring constant, high damping efficiency, side pads 15. Because they are not load-bearing and, therefore, can be manufactured and oriented independently of the load-bearing function, the side pads 15 can be tailored to optimize their ability to absorb and dissipate horizontal shock and vibration. It should be noted that this ability to transfer the horizontal vibration duty from the bottom pad, is to a great extent due to the directional character of felt. If a non-directional material, such a rubber, were used as the bottom pad and the pad were of any significant thickness, the shear vibration would set up a "jello" effect which would extend the vibration time rather than damp the system.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machinery mount, comprising:
   a. a pocket member having an upwardly-directed recess,
   b. a nut member located in the recess and having a threaded central aperture,
   c. a threaded jack extending through the aperture in the nut member and having a lower end engaging the bottom of the recess in the pocket member,
   d. a base having spaced upwardly-directed flanges between which the pocket member resides, and
   e. a side pad extending between each flange of the base and the pocket member, the pads being formed of felt, and the pocket member having flanges which extend downward from it.

2. A machinery mount as recited in claim 1, wherein the base has a flat bottom surface, and a resilient base and covers the bottom surface.

3. A machinery mount as recited in claim 2, wherein the base pad and the side pads are separate pieces.

4. A machinery mount as recited in claim 2, wherein the pads are formed in shapes having parallel flat surfaces.

5. A machinery mount as recited in claim 1, wherein the pocket and base are in direct contact.

6. A machinery mount as recited in claim 1, wherein the nut member is held against rotation within the recess.

* * * * *